United States Patent [19]

Young

[11] Patent Number: 4,970,677

[45] Date of Patent: Nov. 13, 1990

[54] FULL ADDER CIRCUIT WITH IMPROVED CARRY AND SUM LOGIC GATES

[75] Inventor: William R. Young, Palm Bay, Fla.

[73] Assignee: Harris Corporation, Melbourne, Fla.

[21] Appl. No.: 361,439

[22] Filed: Jun. 5, 1989

[51] Int. Cl.$^5$ .............................................. G06F 7/50
[52] U.S. Cl. ...................................................... 364/784
[58] Field of Search .................. 307/451; 364/784–788

[56] References Cited

U.S. PATENT DOCUMENTS

| | | | |
|---|---|---|---|
| 4,425,623 | 1/1984 | Russell | 364/786 |
| 4,546,446 | 10/1985 | Machida | 364/759 |
| 4,559,608 | 1/1983 | Young et al. | 364/786 |
| 4,620,117 | 10/1986 | Fang | 307/451 |
| 4,623,982 | 11/1986 | Ware | 364/788 |
| 4,761,760 | 8/1988 | Tomoji | 364/788 |

Primary Examiner—Dale M. Shaw
Assistant Examiner—Long T. Nguyen
Attorney, Agent, or Firm—Barnes & Thornburg

[57] ABSTRACT

First and second input gates and an input inverter are provided for preprocessing respectively a plurality of input signals and an additional input signal, in addition to a carry gate and a sum gate. The first input gate is connected to each of a plurality of input bits for providing a logic low output only when all of its inputs are a logic high. The second input gate is connected to the plurality of input bits for providing a logic high only when all of its inputs are a logic low. The carry gate has three inputs and provides a carry-out logic high output when either (a) its first input from the first logic gate is a logic low; or (b) when both the second input from the second input gate and the third input from the inverter are a logic low. The sum gate has five inputs and provides a sum logic high output when either (a) both its first and second inputs from the output of a first input gate and from the inverter are logic low; or (b) its third input from the carry gate is at a logic low and either of the fourth or fifth inputs from the inverter or the second input gate are respectively a logic low.

14 Claims, 5 Drawing Sheets $C_N = A_N B_N + C_{N-1}(A_N + B_N)$ $S_N = A_N B_N C_{N-1} + \overline{C_N}(A_N + B_N + C_{N-1})$

FULL ADDER CIRCUIT WITH IMPROVED CARRY AND SUM LOGIC GATES

BACKGROUND AND SUMMARY OF THE INVENTION

The present invention relates generally to adders and more specifically to an adder to be used with multipliers and digital signal processors.

A full adder is an adder which adds the two numbers together and includes for each bit a sum and a carry output in response to a pair of binary bit inputs and a carry input from the previous stage. Static adders, or those that are not precharged, have logic to bias the output high as well as biasing it low for appropriate input signals. Prior art adders generally include a carry gate and a sum gate each being connected to the two-bit input and the carry input. A typical carry gate G1 of the prior art is illustrated in FIG. 1 as including N channel devices N1 through N5 connected between ground and the output $\overline{C_N}$ and P channel devices P1 through P5 connected between V+ and the output $\overline{C_N}$. The gates are connected respectively to the bit inputs $A_N$ and $B_N$ as well as the carry from the previous stage, $C_{N-1}$. The output:

$$\overline{C_N} = \overline{A_N B_N + C_{N-1}(A_N + B_N)}$$

In this gate, each of the bit inputs $A_N$ and $B_N$ are connected to a minimum of four transistors and the carry from the previous stage $C_{N-1}$ is connected to a pair of transistors.

The sum gate G2 is illustrated in FIG. 2 as including N channel transistors N11 through N17 and P channel transistors P11 through P17 connected between ground and V+ respectively and the output $\overline{S_N}$. Again, each of the bit inputs $A_N$ and $B_N$ are connected to four transistors, the carry from the previous stage $C_{N-1}$ is connected to four transistors, and the carry signal from the present stage $\overline{C_N}$ is connected to a pair of transistors. The sum gate G2 has a maximum stack of three transistors high between a voltage source and the output terminal. Thus, between the two gates G1 and G2 there are 24 transistors, having a minimum stack height of two and a maximum stack height of three, and the inputs $A_N$ and $B_N$ are connected respectively to eight transistors, and the input $C_{N-1}$ is connected to six transistors. This is a substantial fan out of the input signal.

Thus, it is an object of the present invention to provide an improved full adder including improved carry gates and sum gate.

Another object of the present invention is to provide an improved full adder which minimizes fan-out of the input signal.

An even further object of the present invention is to provide an adder with reduced transistor stack height.

A still even further object of the present invention is to provide a carry gate of reduced input signal fan-out and stack height.

An even further object of the present invention is to provide a sum gate having reduced input signal fan-out and stack height.

These and other objects are obtained by providing first and second input gates and an input inverter for preprocessing the input signals, a carry gate and a sum gate. The first input gate is connected to each of the input bits for providing a logic low output only when all its inputs are a logic high. The second input gate is connected to each of the input bits for providing a logic high only when all of its inputs are a logic low. The inverter provides the inverse of an additional input bit if the inverse is not available. The carry gate has three inputs and provides a carry-out logic high output when either (a) its first input from the first logic gate is a logic low; or (b) when both the second input from the second input gate and the third input from the inverter are a logic low. The sum gate has five inputs and provides a sum logic high output when either (a) both its first and second inputs from the output of a first input gate and from the inverter are logic low; or (b) its third input from the carry gate is at a logic low and either of the fourth or fifth inputs from the inverter or the second input gate are respectively a logic low.

The carry gate includes a first switch connected between the carry gate output and a logic source which is activated by a low signal from the first input gate. A pair of series connected second and third switches connects the logic high supply and the carry gate output and is activated respectively by a low from the output of the second input gate and the output of the inverter. A fourth switch connects a logic low supply to the carry gate output and is activated by a logic high at the output of the second input gate. A pair of series connected fifth and sixth switches connect the logic low supply and the carry output and are activated respectively by high signals on the output of the first input gate and the output of the inverter.

The sum gate includes first and second switches connected in series between a logic high supply and the sum gate output and activated respectively by lows on the output of the first input gate and the inverter. A third switch is connected in series with the parallel connection of a fourth and fifth switch between the logic high supply and the sum gate output and activated respectively by logic lows on the output of the carry gate and either the second input gate or the inverter. The sum gate also includes a sixth and seventh switch connected in series between the logic low supply and the sum gate output and activated by high signals on the output of the second input gate and the inverter. An eighth switch is connected in series with a parallel connection of a ninth and tenth switch between the logic low supply and the sum gate output and activated respectively by logic highs on the output of the carry gate and either the first input gate or the inverter.

The first and second input gates for two bits each include a first and second transistor connected between a first logic supply and the output in parallel and third and fourth transistors connected between a second logic supply and the output in series. The inputs are each connected to one of the parallel switches and one of the series switches.

The first and second input logic gates each include four transistors having a minimum stack of one and a maximum stack of two and the inverter includes a pair of transistors having a maximum stack of one. The input signals of each bit are connected only to four transistors with the input signal of the carry-in from the previous stage being connected to only two transistors. The carry gate includes six transistors having a minimum stack height of one and a maximum stack height of two and each of its inputs are connected only to a pair of transistors. The sum gate includes ten transistors having a minimum and maximum stack height of two with each of its inputs connected to two transistors. Although the input signals have a maximum fan-out of four, the maximum internal fan-out of any signal is the output of the inverter or the carry-in signal from the previous stage which has a fan-out of six.

Other objects, advantages and novel features of the present invention will become apparent from the following detailed description of the invention when considered in conjunction with the accompanying drawings.

DETAILED DESCRIPTION OF THE DRAWINGS

Figure 1:
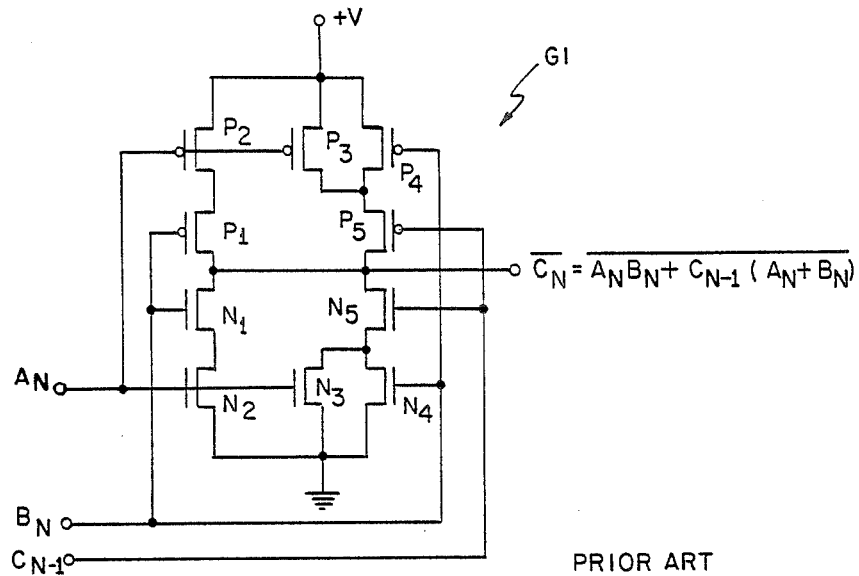
FIG. 1 is a schematic of a carry gate of the prior art.

FIG. 1 shows a schematic for the carry gate of the prior art wherein the positive input signals $A_N$, $B_N$ and $C_{N-1}$ represent a bit from each of the numbers to be added and a carry from the previous stage. This is a single stage for each bit of the two numbers to be added. The output:

$$\overline{C_N} = \overline{A_N B_N + C_{N-1}(A_n + B_N)}$$

This logic is represented by the P1 and P2 transistors being connected in series and having their inputs connected to the $A_N$ and $B_N$ and the parallel connection of P3 and P4 being connected in series with the transistor P5 whose gates are connected respectively to the bit inputs $A_N$, $B_N$ and $C_{N-1}$. When the respective combination of these inputs are low, a logic high V+ is applied to the output $\overline{C_N}$. Serially connected transistors N1 and N2 having their gates connected to $B_N$ and $A_N$ respectively, connect ground to the output $\overline{C_N}$ and parallel connected N3 and N4 are connected in series with N5 between ground and the output $\overline{C_N}$ and have their gates connected to $A_N$, $B_N$ and $C_{N-1}$, respectively. When the appropriate combination of these signals is high, a ground or logic low is provided on the output $\overline{C_N}$. It will be noted that the N channel and P channel devices are connected and function as inverters wherein each of the input signals is connected to a complementary transistor in the same logic configuration between the output and the appropriate logic high or logic low supply.

Figure 2:
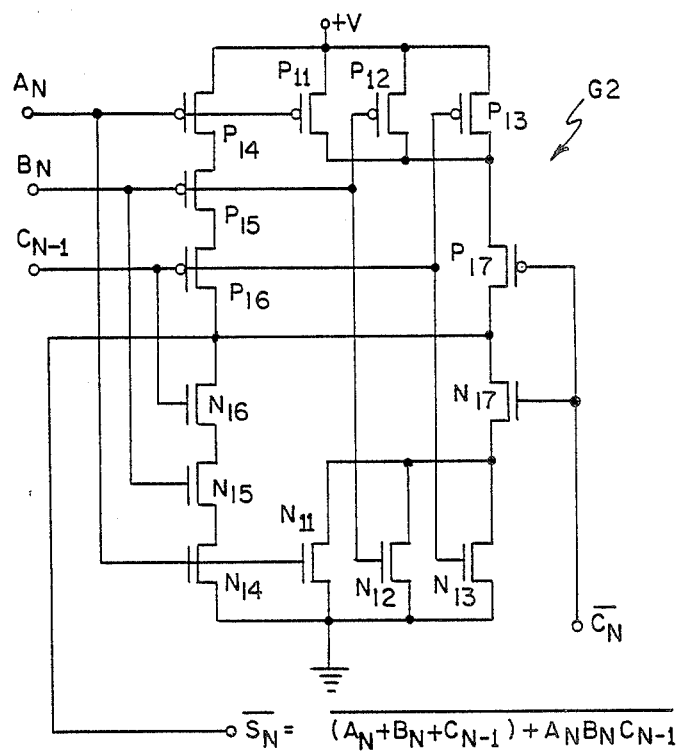
FIG. 2 is a schematic of a sum gate of the prior art.

As shown in FIG. 2, the sum gate G2 of the prior art includes parallel connected switches P11, P12 and P13 connected in series with P17 between V+ and the output $\overline{S_N}$ and have their gates connected respectively to $A_N$, $B_N$, $C_{N-1}$ and $\overline{C_N}$. Transistors P14, P15 and P16 are serially connected between V+ and $\overline{S_N}$ and have their gates connected respectively to $A_N$, $B_N$ and $C_{N-1}$.

Parallel connected transistors N11, N12 and N13 are connected in series to N17 between ground and the output $\overline{S_N}$ and have their gates respectively connected to $A_N$, $B_N$, $C_{N-1}$ and $\overline{C_N}$. Series connected transistors N14, N15 and N16 are connected between ground and the output $\overline{S_N}$ and have their gates respectively connected to $A_N$, $B_N$ and $C_{N-1}$. As with the carry gate G1 of FIG. 1, the gate G2 of FIG. 2 includes for each transistor P a complementary connected transistor N responsive to the same signals and acting basically as inverters.

Figure 3:
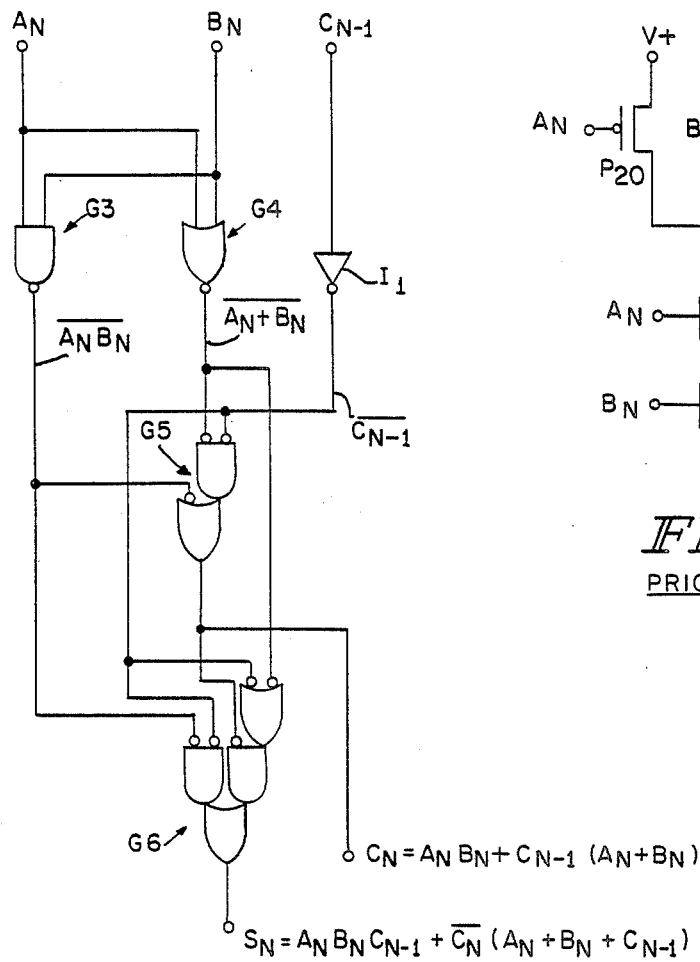
FIG. 3 is a logic diagram of a full adder for positive inputs incorporating the principles of the present invention.
Figure 8:
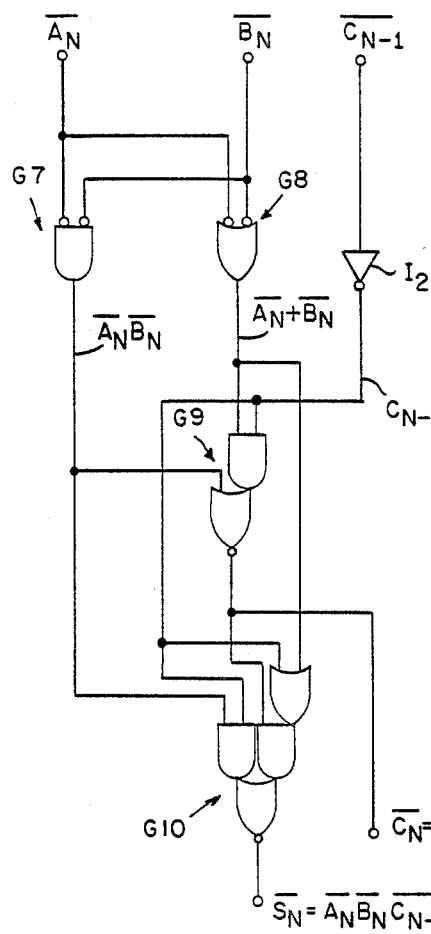
FIG. 8 is a block diagram of a full adder for negative input signals incorporating the principles of the present invention.

FIGS. 3 and 8 illustrate the logic diagram incorporating the principles of the present invention for input bits $A_N$ and $B_N$ and the carry from the previous stage $C_{N-1}$ and provide the output for the carry $C_N$ and the sum $S_N$ in positive and negative logic respectively. The negative outputs of FIG. 8 may be further inverted or used in alternating stages with the outputs of FIG. 3 as explained in U.S. Pat. No. 4,559,608 to Young et al.

Referring to FIG. 3, the bit inputs of the two numbers $A_N$ and $B_N$ are provided to a pair of input gates G3 and G4 illustrated as a NAND and NOR gate respectively. The output of the first input gate G3 represents $\overline{AB}$ and the output of the second input gate gate G4 represents $\overline{A+B}$. The carry from the previous stage $C_{N-1}$ is inverted by inverter I1 to $\overline{C_{N-1}}$. If the inverse $\overline{C_{N-1}}$ is available, the invert I1 can be deleted. Carry gate G5 has three inputs from the output of the input gates G3 and G4 and the inverter I1. The sum gate G6 has five inputs from the outputs of input gate G3, the inverter I1, the carry gate G5, the inverter I1 and the input gate G4. As will be noted from the detailed description of FIGS. 4–7, the specific gate structure provides a lower stacking height and smaller input signal fan-out than the prior art gate structure of FIGS. 1 and 2.

Figure 4:
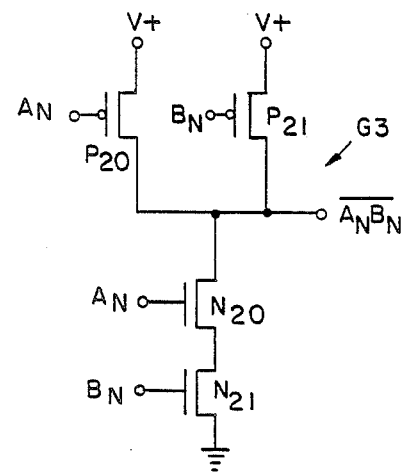
FIG. 4 is a schematic of input gate G3 of FIG. 3.
Figure 5:
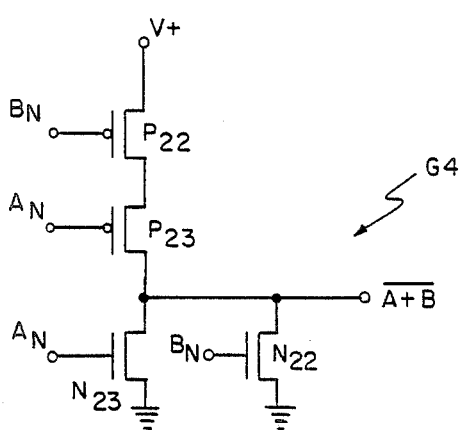
FIG. 5 is a schematic of input gate G4 of FIG. 3.

The first input gate G3 as illustrated in FIG. 4 includes P channel devices P20 and P21 connected in parallel between the logic high V+ and the output of the gate with their inputs connected to $A_N$ and $B_N$ respectively. It also includes serial connected transistors N20 and N21 connected between logic low ground and the gate output and their gates connected respectively to the inputs $A_N$ and $B_N$. The second input gate G4, as illustrated in FIG. 5, includes the serially connected transistors P22 and P23 connected between V+ and the output and their gates connected to $B_N$ and $A_N$ respectively. It also includes parallel connected transistors N22 and N23 connected between ground and the output terminal with their gates connected to the inputs $B_N$ and $A_N$ respectfully.

Thus, it can be seen that for the two inputs gates G3 and G4 illustrated in FIGS. 4 and 5, each of the inputs is connected to a maximum of four transistors which is the maximum fan-out of the input signals. Also, it should be noted that the connection of the P transistors and the N transistors in each of the gates are not connected as inverters or receiving the same signal and being connected between the respective power supply and the output but the P and N transistors are connected as logical inversions of each other.

Figures 6A, 6B:
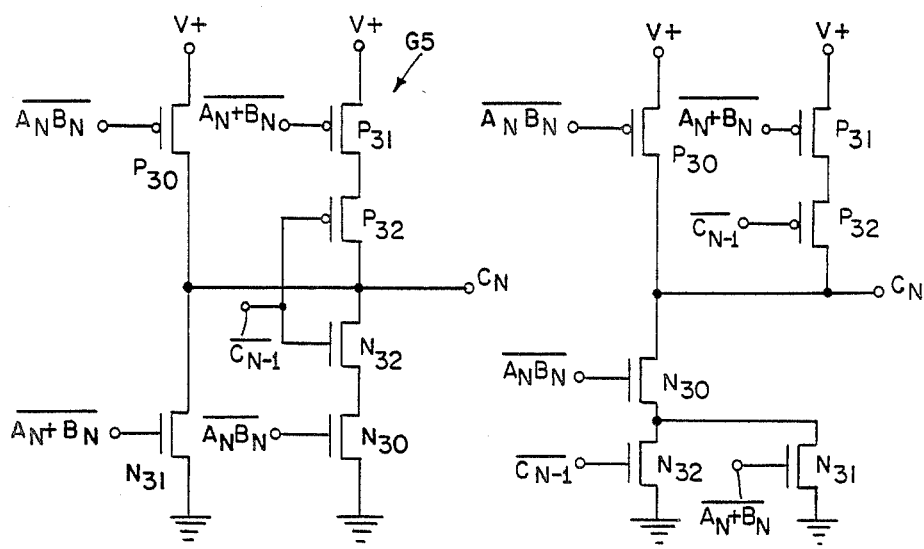
FIGS. 6A and 6B are schematics of carry gate G5 of FIG. 3.

The carry gate G5 is illustrated in FIG. 6A as including P30 connected between V+ and the output $C_N$ and having its gate connected to the output of G3. P31 and P32 are connected in series between V+ and $C_N$ and have their gates connected respectively to the output of G4 and the inverter I1. N31 is connected in series between ground and the output $C_N$ and has its gate connected to the output of the input gate G4. Transistors N30 and N32 are connected in series between ground and the output $C_N$ and have their gates connected respectively to the output of the input gate G3 and the inverter I1. As with the gates G3 and G4, the N channel devices and the P channel devices are logic complements of each other and not merely complementary transistors connected to the same input as inverter.

It should be noted that the connection of N30, N31 and N32 in FIG. 6A is a simplification of the logical inverse of the connection of P30, P31 and P32. The unsimplified logic connection illustrated in FIG. 6B includes the devices N31 and N32 being connected in parallel and this parallel combination be connected in series with N30. This produces a logic equivalent of the series connection of N30 and N32, as shown in FIG. 6A in series and a series connection of an additional N30 and N31. Since N30 and N31 as a series connection would only both be turned on when N31 is turned on with a high signal, the additional N30 was deleted. Thus, the structure of FIG. 6A produces a simpler and substantially smaller stacking with a minimum stack of one and a maximum stack of two with each input being used only twice. Also, as will be explained with respect to FIGS. 11A and 11B, the simplification produces identical logic structure for non-inverted and inverted input signals.

Figure 7:
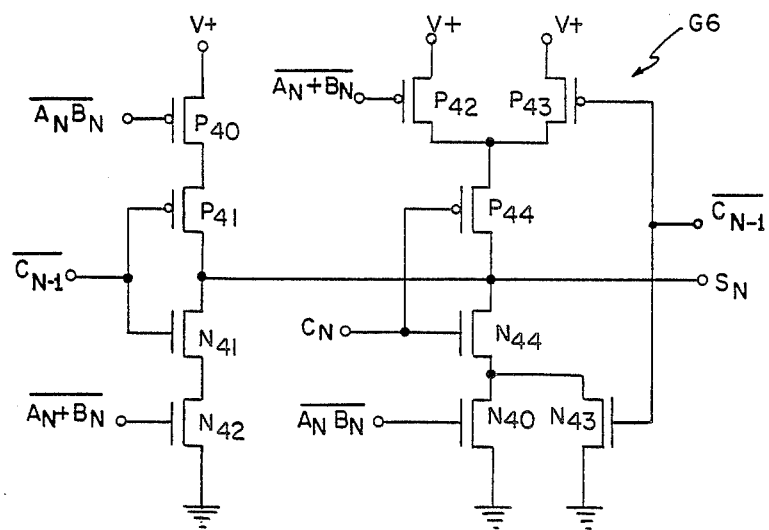
FIG. 7 is a schematic of carry gate G6 of FIG. 3.

The sum gate G6 is illustrated in FIG. 7 as including series transistors P40 and P41 connected between V+ and the output $S_N$ with their gates connected to the output of G3 and the inverter I1 respectively. Parallel connected transistors P42 and P43 are connected in series with P44 between V+ and $S_N$ and have their gates connected to the output of G4, the inverter I1 and the output of the carry gate G5 respectively. N41 and N42 are connected in series between ground and the output $S_N$ and have their gates connected to the output of the inverter I1 and the input gate G4 respectively. Parallel connected transistors N40 and N43 are connected in series with N44 between ground and the output $S_N$ and have their inputs connected respectively to the output of G3, the inverter I1 and the carry gate G5. As in FIG. 6A, the transistors are logic complements of each other with the same simplification with respect to any stack including a combination of the outputs of the gates G3 and G4. Also as in FIG. 6A, the sum gate G6 has a maximum stack of two transistors with each of the inputs being used twice except for two inputs being used twice each from the inverter I1.

A review of FIGS. 4–7 will reveal that the logic gates include a minimum stack of one and a maximum stack of two with the inputs to the circuit having a fan out of no greater than four with the internal generated signals having a fan out of no greater than six. The maximum fan out is from the output of the inverter I1.

A review of the operation of the gates G3 through G6 is as follows: The output of the input gate G3 is low only when both the inputs $A_N$ and $B_N$ are high. The input gate G4 has a logic high only when both the inputs $A_N$ and $B_N$ are logic low. The carry gate G5 has a logic high output when the input from the gate G3 is low or when the output of gate G4 and the inverter I1 are low. The sum gate G6 has a logic high output when the output of G3 and the output of the inverter I1 are both low or when the carry output of gate G5 is low and either of the outputs of the input gate G4 or the output of the inverter I1 is low.

A full adder for receiving inverted signals $\overline{A}_N$, $\overline{B}_N$ and $\overline{C}_{N-1}$ is illustrated in FIG. 8. A first input gate G7 is a NOR gate and the second input gate G8 is a NAND gate each receiving each of the bits $\overline{A}_N$ and $\overline{B}_N$ and providing outputs $\overline{A}_N\overline{B}_N$ and respectively. An inverter I2 provides the inverse $C_{N-1}$ of input $\overline{C}_{N-1}$ and may be deleted if $C_{N-1}$ is available as an input. The carry gate G9 receives the output from the input gates G7 and G8 and from the inverter I2 to provide a carry signal:

$$\overline{C}_N = \overline{A}_N\overline{B}_N + \overline{C}_{N-1}(\overline{A}_N + \overline{B}_N)$$

The carry gate G10 receives inputs respectively from the input gate G7, the inverter I2, the carry gate G9, the inverter I2 and the input gate G8 and provides a sum output:

$$\overline{S}_N = \overline{A}_N\overline{B}_N\overline{C}_{N-1} + C_N(\overline{A}_N + \overline{B}_N + \overline{B}_N)$$

Figure 10:
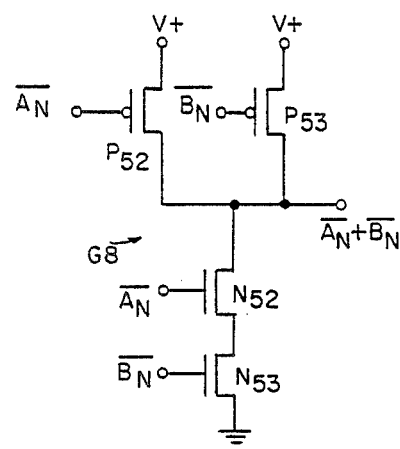
FIG. 10 is a schematic of input gate G8 of FIG. 8.
Figure 9:
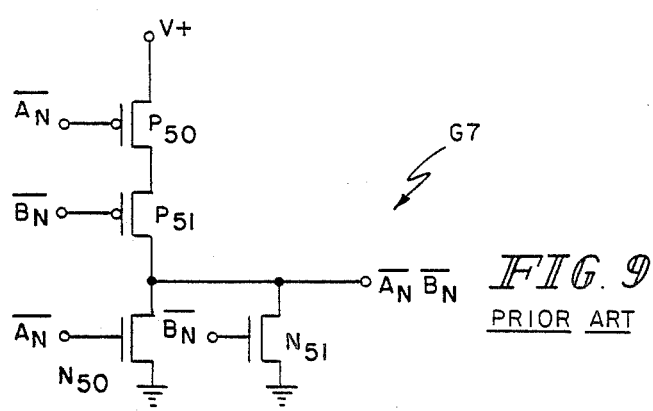
FIG. 9 is a schematic of input gate G7 of FIG. 8.

The input gate G7 is illustrated in FIG. 9 as including series connected transistors P50 and P51 and parallel connected transistors N50 and N51 connected to a respective input $\overline{A}_N$ and $\overline{B}_N$. The input gate G8, as illustrated in FIG. 10, includes parallel connected transistors P52 and P53 and series connected transistors N52 and N53 connected to the inputs $\overline{A}_N$ and $\overline{B}_N$.

Figures 11A, 11B:
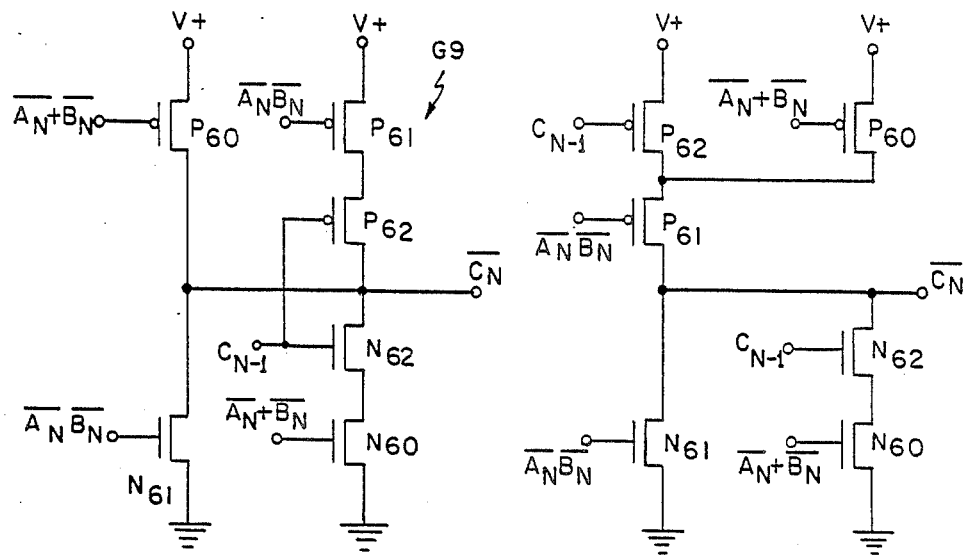
FIGS. 11A and 11B are schematics of carry gate G9 of FIG. 8.

The carry gate G9, as illustrated in FIG. 11A, includes transistor P60 having its input connected to the output of gate G8 and series connected transistors P61, P62 connected to the outputs of gates G7 and I2 respectively. Transistor N61 has its gate connected to the output of gate G7 and series connected transistors N60 and N62 have their gates connected to the output of gates G8 and the inverter I2 respectively. The carry gate G9's structure before simplification is illustrated in FIG. 11B.

Figure 12:
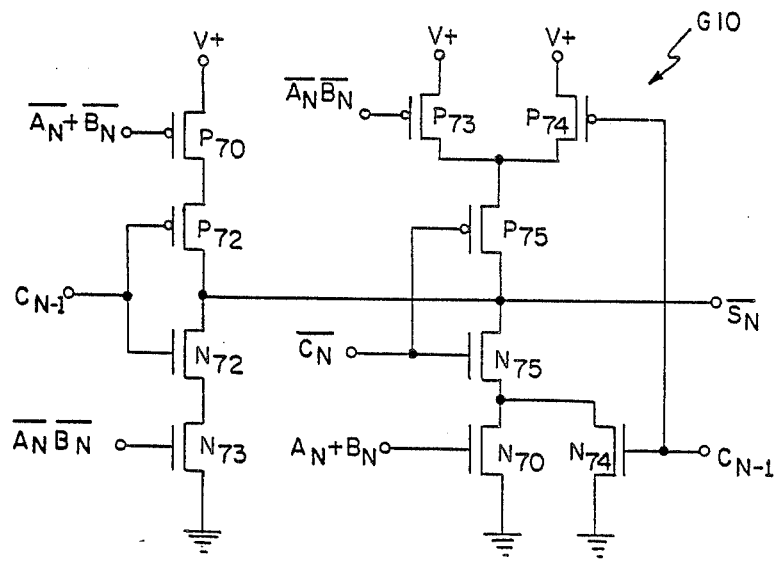
FIG. 12 is a schematic of the sum gate G10 of FIG. 8.

The sum gate G10 is illustrated in FIG. 12 and includes series connected transistors P70 and P72 having their gates connected to the output of gate G8 and inverter I2. Parallel connected transistors P73 and P74 are connected in series with transistor P75 having their gates connected to the outputs of gate G7, the inverter I2 and gate G9 respectively. Transistors N72 and N73 are connected in series and have their gates connected to the output of inverter I2 and gate G7, respectively. Parallel connected transistors N70 and N74 are connected in series with transistor N75 and have their gates respectively connected to the outputs of gate G8, inverter I2 and gate G9.

The gates G7 through G10 have their transistors connected in complementary logic structure versus inverter structure using the simplification as discussed for the gates G3 through G6. A comparison of the carry gate G5 of FIG. 6A and the carry gate G9 of FIG. 11A will show they include identical transistor structure with their input gates being connected to logically identical signals of the inputs A and B. For example, corresponding transistors P30 and P60 have logically identical input signals $\overline{A_N B_N}$ and $\overline{A}_N + \overline{B}_N$, respectively. Similarly, the sum gate G6 of FIG. 7 and the sum gate G10 of FIG. 12 are identical transistor structures having their gates connected to logically identical signals of the inputs A and B. Therefore, only one full adder cell is required to produce $C_N$, $S_N$, or $\overline{C}_N$, $\overline{S}_N$, depending on the respective inputs $A_N$, $B_N$, $C_{N-1}$, or $\overline{A}_N$, $\overline{B}_N$, $\overline{C}_{N-1}$.

Thus, it can be seen from the detailed description of the drawings that the objects of the invention are attained in that the input signal fan-out and stack height is reduced.

Although the present invention has been described and illustrated in detail, it is to be clearly understood that the same is by way of illustration and example only, and is not to be taken by way of limitation. The full adder has been described as a binary number adder of $A_N$ and $B_N$ with a carry-in $C_{N-1}$. It could also be used as a carry-save adder of three binary numbers A, B, C. Also, the carry gates G5, G9 and the sum gates G6, G10 can be used as illustrated with any numbers of input bits without modification. The input structure G3, G4, I1, G7, G8, I2 would be modified to provide a NAND and NOR signal, respectively, of all the input signals with the inverters providing an additional signal. The spirit and scope of the present invention are to be limited only by the terms of the appended claims.

What is claimed is:

1. An adder for adding a plurality of binary numbers and an additional binary number, said adder including one stage per bit, each said stage comprising:
   a plurality of input terminals for receiving a bit of a respective binary number;
   an inverted input terminal for receiving a bit of said addition binary number logically inverted;
   a first input gate means having a plurality of inputs connected to said plurality of input terminals for providing a logic low output only when all of its inputs are logic high;
   a second input gate means having a plurality of inputs connected to said plurality of input terminals for providing a logic high only when all of its inputs are logic low;
   a carry gate means having first, second and third inputs connected respectively to outputs of said first input gate means, said second gate means and said inverted input terminal for providing a carry-out logic high output when either (a) its first input is at a logic low; or (b) both of said second and third inputs are a logic low; and
   a sum gate means having first, second, third, fourth and fifth inputs connected respectively to outputs of said first input gate means, said inverted input terminal, said carry gate means, said inverted input terminal and said second input gate means for providing a sum out logic high output when either (a) both its first and second inputs are a logic low; or (b) its third input is at a logic low and either of its fourth or fifth inputs are at a logic low.

2. An adder according to claim 1, wherein said carry gate means includes:
   a logic high supply, a logic low supply and a carry gate output;
   a first switch means connected between said logic high supply and said carry gate output and activated by a logic low at said carry gate means' first input; and
   a second and third switch means connected in series between said logic high supply and said carry gate output and activated respectively by a logic low at said carry gate means' second and third inputs.

3. An adder according to claim 2, wherein said carry gate means further includes:
   a fourth switch means connected between said logic low supply and said carry gate output and activated by a logic high at said carry gate means' second input; and
   a fifth and sixth switch means connected in series between said logic low supply and said carry gate output and activated respectively by a logic high at said carry gate means' first and third inputs.

4. An adder according to claim 3, wherein said first, second and third switch means are transistors of an opposite conductivity type than transistors which constitute said fourth, fifth and sixth switch means.

5. An adder according to claim 3, wherein said sum gate means includes:
   a sum gate output;
   first and second switching means connected in series between said logic high supply and said sum gate output and activated respectively by logic lows at said sum gate means' first and second inputs; and
   third switching means connected in series with parallel connected fourth and fifth switching means between said logic high supply and said sum gate means' output and activated respectively by a logic low at said sum gate means' third and either fourth or fifth inputs.

6. An adder according to claim 5, wherein said sum gate means further includes:
   sixth and seventh switching means connected in series between said sum gate output and logic low supply and activated respectively by a logic high at said sum gate means' second and fifth inputs; and
   eight switching means connected in series with parallel connected ninth and tenth switching means between said sum gate output and said logic low supply and activated respectively by a logic high on said sum gate means' third and either first or fourth inputs.

7. An adder according to claim 6, wherein said first through fifth switching means are transistors of an opposite conductivity type than transistors which constitute said sixth through tenth switching means.

8. An adder according to claim 1, wherein said sum gate means includes:
   a logic high supply, logic low supply and a sum gate output;
   first and second switching means connected in series between said logic high supply and said sum gate output and activated respectively by logic lows at said sum gate means' first and second inputs; and
   third switching means connected in series with parallel connected fourth and fifth switching means between said logic high supply and said sum gate means' output and activated respectively by a logic low at said sum gate means' third and either fourth or fifth inputs.

9. An adder according to claim 8, wherein said sum gate means further includes:
   sixth and seventh switching means connected in series between said sum gate output and said logic low supply and activated respectively by a logic high at said sum gate means' second and fifth inputs; and
   eighth switching means connected in series with parallel connected ninth and tenth switching means between said sum gate output and said logic low supply and activated respectively by a logic high on said sum gate means' third and either first or fourth inputs.

10. An adder according to claim 9, wherein said first through fifth switching means are transistors of an opposite conductivity type than transistors which constitute said sixth through tenth switching means.

11. An adder according to claim 1, wherein said adder is a full adder and said additional binary number is a carry word providing carry-in bits to a successive stage.

12. An adder according to claim 1, wherein said adder is a carry-save adder.

13. A sum logic gate, for generating a sum signal for a plurality of bit signals, an additional bit signal and carry signal, comprising:
- first input means for receiving a logic low representing all of said plurality of bit signals are a logic high;
- second input means for receiving an inverse of said additional bit signal;
- third input means for receiving a carry signal;
- fourth input means for receiving an inverse of said additional signal;
- fifth input means for receiving a logic high representing all of said plurality of bit signals are a logic low;
- a logic high supply, a logic low supply and a sum gate output;
- first and second switching means connected in series between said logic high supply and said sum gate output and activated respectively by logic lows at said first and second input means;
- third switching means connected in series with parallel connected fourth and fifth switching means between said logic high supply and said sum gate output and activated respectively by a logic low at said third and either fourth or fifth input means;
- sixth and seventh switching means connected in series between said sum gate output and said logic low supply and activated respectively by a logic high at said second and fifth input means; and
- eight switching means connected in series with parallel connected ninth and tenth switching means between said sum gate output and said logic low supply and activated respectively by a logic high on said third and either first or fourth input means.

14. A sum logic gate according to claim 13, wherein said first through fifth switching means are transistors of an opposite conductivity type than transistors which constitute said sixth through tenth switching means.

* * * * *